Oct. 9, 1956

H. B. CONANT 2,765,847

MACHINE FOR AUTOMATICALLY MEASURING
AND CUTTING MATERIAL
Filed Feb. 4, 1952

INVENTOR.
Harold B. Conant
BY
ATTORNEY.

United States Patent Office 2,765,847
Patented Oct. 9, 1956

2,765,847
MACHINE FOR AUTOMATICALLY MEASURING AND CUTTING MATERIAL

Harold B. Conant, Lincoln, Nebr.

Application February 4, 1952, Serial No. 269,770

2 Claims. (Cl. 164—49)

The present invention relates to devices for working of materials in manufacturing processes, and more specifically to a machine for measuring, cutting and counting of the pieces cut.

In many manufacturing operations, the cutting of large quantities of identical pieces of materials of various kinds is involved. The specific material may be wire, rod, sheet metal, electrical insulation or various other stock; and while the cutting operation may be, and has heretofore been, performed manually or through use of punch presses, this invention has for its primary object the provision of simple means whereby the measuring, cutting and counting tasks may be performed automatically in a single machine, with a relatively high degree of precision and accuracy.

It is the most important object of the present invention, therefore, to provide a machine that is extremely simple, not only in manufacture but in use, thereby affording low cost of construction and ease of maintenance.

Another important object hereof is to provide a machine including gears that may be obtained from standard stock, the precise length of the cut being determined by the diameter of a pair of opposed feed rolls for the stock to be severed.

Another important object hereof is to provide a machine of the aforesaid character that may be made extremely compact, thereby occupying a minimum of space, yet capable of performing most of the cutting operations.

A further object hereof is to provide an automatically operating machine that includes the use of a pawl that remains engaged beyond the actual end of the feed stroke, thereby presenting positive stopping of the feeding or advancement of the stock at the desired length of the cut to be made.

An additional object hereof is to provide a machine that will obviate errors in feeding which usually result in spoiled work, since because of the aforesaid pawl, there must be an actual and positive engagement thereof with the drive gear before the stock can be advanced. Furthermore, back feeding cannot occur because in the present machine, as will hereinafter by made clear, the pawl completely disengages from the feed gear before starting its return stroke.

Other important objects will be made clear or become apparent as the following specification progresses, reference being had to the accompanying drawing, wherein.

Figure 4:
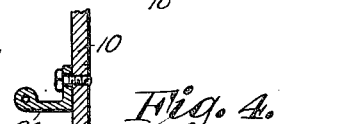
Fig. 4 is a fragmentary, detailed, cross-sectional view taken on line IV—IV of Fig. 1, looking in the direction of the arrows.

A suitable support for all of the mechanism of the machine about to be described may be provided, and in the drawing the same is shown as a vertical plate designated by the numeral 10 and having a laterally extending, horizontal shelf 12 at the lowermost edge thereof for supporting a receptacle 14 disposed to receive pieces 16 from material 18, cut through use of the machine hereof. In addition to plate 10 and shelf 12, the support includes a plate 20 extending upwardly from the shelf 12 at one end thereof in spaced parallelism to the plate 10. Plates 10 and 20 receive and support a pair of superimposed, parallel, horizontal shafts 22 and 24 for receiving feed rolls 26 and 28, respectively, for the stock 18, the rolls 26 and 28 being interposed between the plates 10 and 20. Shafts 22 and 24 likewise have small pinions 30 and 32, respectively, on that side of the plate 20 opposite to the rolls 26 and 28. The rolls 26 and 28 may be made of any suitable material capable of frictionally gripping and engaging the stock 18 to move the same along a substantially rectilinear path of travel into and through a guide 34 carried by the plate 10. The guide 34 may vary in form, depending upon the nature of the stock being cut, and since the same is shown at 18 as wire or rod-like in form, the guide 34 may constitute a tubular member, as is clear in Figs. 1 and 4 of the drawing.

The pinions 30 and 32 are driven through the medium of a pair of intermeshing gears 36 and 38 that also mesh with the pinions 30 and 32, respectively. Gears 36 and 38 are on the same side of plate 20 as the pinions 30 and 32 and are carried by parallel, horizontal shafts 40 and 42, respectively, mounted in the plates 10 and 20.

Gear 36, forming a part of the material advancing mechanism, is rotated by drive means that includes a shaft 44 mounted in a bearing 46, in turn carried by the plate 10 at the uppermost edge thereof. Shaft 44 may, of course, be driven in any suitable manner not herein shown and is provided with an elongated crank 48 that is offset to present cam means 50 engaging a roller 52 on an elongated, swingable bar 54. Bar 54 and roller 52 present means for coupling the drive means 44—48 with an elongated, reciprocable cutter 56. Bar 54 is pivotally connected with the plate 10, as at 58, whereas the cutter 56 has pivotal connection with the bar 54, as at 60. Suitable guide means 62 on the plate 10 is provided for the cutting apparatus 56, the latter cooperating with the proximal end of the guide means 34 to shear the stock 18 into pieces 16 of predetermined length. Bar 54 is yieldably held at one end of its path of travel with roller 52 biased against cam 50 by means of a spring 64 on the plate 10. Counting means 66, of any suitable nature and secured to plate 10, is joined to the bar 54 by means of a link 68.

A number of parts or elements are provided to present coupling structure between the gear 36 and the crank 48, including first an elongated shiftable member or link 70. Crank 48 is provided with a plurality of holes 72 for selectively and pivotally receiving one end of the link 70. The opposite end of the link 70 is pivotally connected with an L-shaped pawl 74 provided with a downturned toe 76. Pawl 74 is in turn pivotally connected with a swingable arm 78 extending radially from a sleeve 80, rotatably carried by an extended end of shaft 40. Stop means for the pawl 74 includes a set screw 82 in the arm 78 and a lock nut 84. Braking means for the arm 78 includes a pair of opposed clamping members 86 partially embracing the sleeve 80 mounted on a bracket 88 that is in turn secured to an extension 90 on plate 20. Clamping members 86 are interconnected by a bolt 92 and yieldably held in frictional engagement with the sleeve 80 by means of a spring 94.

Figure 1:
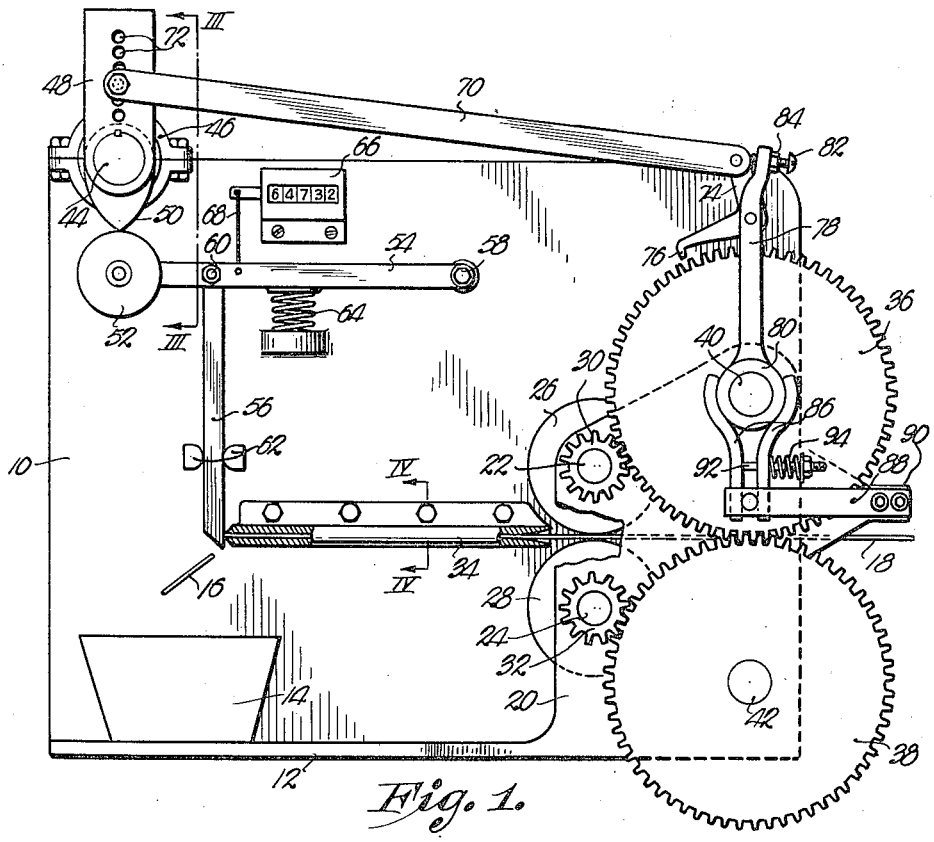
Fig. 1 is a side elevational view of a machine for automatically measuring and cutting material, made pursuant to my present invention, parts being broken away and in section for clearness.
Figure 2:
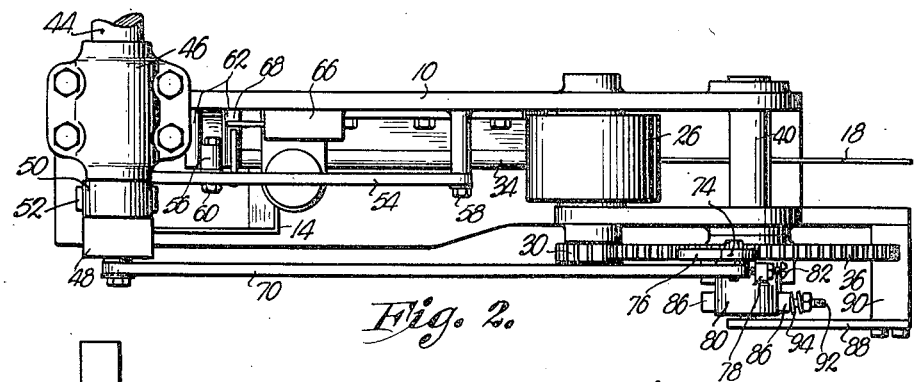
Fig. 2 is a top plan view thereof.
Figure 3:
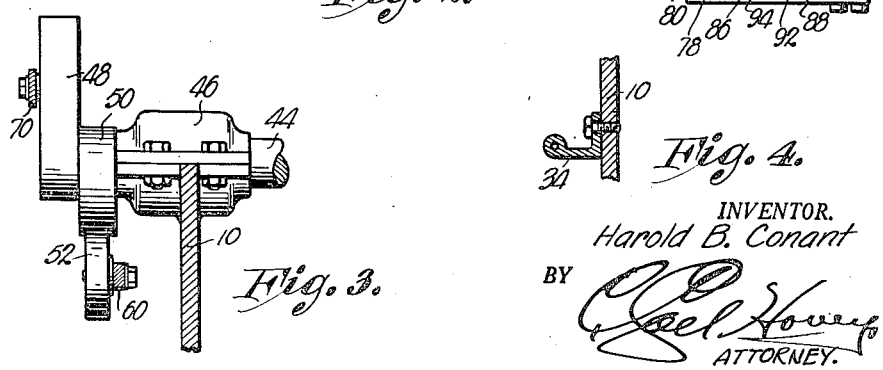
Fig. 3 is a fragmentary, detailed, cross-sectional view taken on line III—III of Fig. 1, looking in the direction of the arrows.

In operation, rotation of the shaft 44 imparts like movement to the crank 48, and as the latter rotates to reciprocate the link 70, pawl 74 is carried therewith and caused to swing toward and away from the gear 36 relative to the arm 78. By virtue of the holding action of brake clamps 86, the first movement as the link 70 moves to the left, viewing Figs. 1 and 2, is for pawl 74 to swing on arm 78 away from stop 82 to thereby move the toe 76 of pawl 74 into engagement with the teeth of gear 36. Continued movement of the link 70 to the left causes anti-clockwise rotation of the gear 36 a predetermined distance. It is clear that gear 38, pinions 30 and 32, and rollers 26 and 28 are thereby rotated to advance the stock material 18 through the guide means 34. During such movement of stock 18, the cutter 56 is retracted upwardly above the guiding means 34, free of the path of travel of material 18. As link 70 returns, i. e. shifts to the right, viewing Figs. 1 and 2, pawl 74 first moves out of engagement with the gear 36 by virtue of the holding action of braking clamps 86, whereupon as soon as pawl 74 strikes stop 82 the arm 78 will be swung in a clockwise direction. Toe 76 having become completely disengaged with respect to gear 36, the latter is not driven in a clockwise direction. Simultaneously with the return movement of the coupling elements between shaft 44 and gear 36, cam 50 engaging roller 52 will swing the bar 54 against the action of spring 64 to shift the cutter 56 downwardly and thereby shear off a piece 16 from stock 18. As bar 54 moves downwardly, counting means 66 will be actuated because of the link connection 68 between counting means 66 and bar 54.

Inasmuch as pinions 30 and 32 are separately driven and are therefore independent of each other, the distance between the centers of shafts 22 and 24 may be varied by merely providing carriers for the bearings thereof which can be readily moved relative to the supporting plates 10 and 20. Thereupon, by substituting rollers of differing diameters, the lengths of pieces 16 may be easily varied. Similarly, some materials may require, in addition to selection of suitable material for the rolls 26 and 28, means to yieldably hold the same biased toward each other and against the stock being advanced. Additionally, the adjustability of link 70 with respect to crank 48 to obtain variance in stroke length and therefore in length of the pieces 16 may take the form of a member slidable on the crank 48 longitudinally thereof, for pivotally receiving the link 70, and having a set screw for releasably holding the same attached to the crank 48.

It is apparent further that with the adjustable features herein shown it is possible to vary the diameters of the gears to present differing numbers of teeth than herein illustrated, thereby decreasing or increasing the cutting range length, all depending upon the nature of the material being cut. Since normal friction will ordinarily cause the stock 18 to stop the moment anti-clockwise rotation of the gear 36 ceases, it is seen that the machine hereof is highly accurate so far as presenting a large number of pieces 16 all of identical length. The speed of cutting is determined solely by the speed of rotation of shaft 44, and it is therefore seen that stock material 18 of various natures may be severed to predetermined lengths rapidly and accurately and without operator attention.

While details of construction may vary, it is clear that those that fairly come within the spirit of this invention as determined by the scope of the appended claims are contemplated hereby.

Having thus described my invention, what I claim as new and desire to secure by Letters Patent is:

1. Apparatus for translating continuous rotary motion to intermittent rotary motion comprising support structure; a pair of spaced, parallel shafts rotatably mounted on the structure, one of said shafts being a drive shaft adapted to be continuously rotated, and the other of said shafts being a driven shaft to which intermittent rotation is to be imparted; a crank rigidly mounted on the drive shaft and extending radially from the latter; a circular gear rigidly mounted on the driven shaft; a cylindrical sleeve rotatably mounted on the driven shaft; braking means mounted on the structure and frictionally engaging the sleeve to yieldably resist rotation of the latter; an arm carried by the sleeve and extending radially of the latter and beyond the circumference of the gear in a direction angled from the plane defined by the shafts; an L-shaped, ratchet pawl having a pair of angulated legs, said pawl being pivotally mounted adjacent the zone of juncture of its legs upon the arm at a point on the latter beyond the circumference of the gear but inwardly of the outer extremity of the arm for swinging movement about an axis parallel to and spaced from the shafts, that one leg of the pawl most nearly tangential to the gear being provided with a toe extension adapted to operatively engage the gear when the pawl is swung in one direction, the other leg extending from said zone outwardly away from the gear; a reciprocable link pivotally interconnected at opposite extremities thereof with the crank and said other leg adjacent the outermost extremity of the latter, respectively; and stop means on the arm adjacent the outermost extremity thereof and engageable with said other leg adjacent the outermost extremity of the latter for limiting swinging movement of the pawl in a direction opposite said one direction of swinging movement thereof, whereby when the pawl has been swung by reciprocation of the link sufficiently to withdraw the toe from operative engagement with the gear, continued reciprocation of the link will swing the arm relative to the gear.

2. In a machine of the kind described, a pair of spaced plates; a pair of feed rolls carried by the plates and disposed therebetween, said rolls being mounted for rotation upon parallel axes and adapted to frictionally engage material to be advanced therebetween; a pinion secured to each roll respectively; a pair of mutually intermeshing gears carried by one of said plates, each of said gears being mounted for rotation upon an axis parallel to said axes, each of said gears being intermeshed with a corresponding pinion; a sleeve mounted for rotation upon the axis of rotation of one of the gears; brake means frictionally engaging the sleeve for resisting rotation of the latter; an elongated arm on the sleeve and extending substantially radially thereof; an L-shaped pawl having a pair of legs and mounted adjacent the zone of juncture of said legs upon the arm intermediate the ends of the latter but outwardly of the circumference of said one gear for swinging movement about an axis parallel to said axes, one of said legs extending generally tangentially of said one gear and carrying parts adapted to engage the latter when the pawl is swung in one direction, the other leg extending outwardly of said one gear; stop means on the arm engageable with said other leg for limiting swinging movement of the pawl relative to the arm; a rotatable shaft; a crank on said shaft; a link interconnecting the crank with said other leg; a guide for said material between the plates for confining the path of travel of the material as it leaves the rolls; a cutter reciprocably mounted between the plates and adapted for severing the material as the latter emerges from the guide when the cutter is at one end of its path of reciprocation; means yieldably biasing the cutter toward the opposite end of its said path; a cam on said shaft; and rockable lever means coupled with the cutter and engageable with the cam for reciprocating the cutter as the shaft is rotated.

References Cited in the file of this patent

UNITED STATES PATENTS

| 155,014 | Drury | Sept. 15, 1874 |
| 157,714 | Cushman et al. | Dec. 15, 1874 |
| 267,573 | Mundell et al. | Nov. 14, 1882 |
| 476,632 | Groff | June 7, 1892 |
| 883,213 | Littlefield et al. | Mar. 31, 1908 |

(Other references on following page)

UNITED STATES PATENTS

| | | |
|---|---|---|
| 1,063,093 | White | May 27, 1913 |
| 1,126,084 | Reisbach | Jan. 26, 1915 |
| 1,128,721 | Ray et al. | Feb. 16, 1915 |
| 1,383,331 | Nordstrom | July 5, 1921 |
| 1,684,617 | Biggert | Sept. 18, 1928 |
| 1,844,820 | Morey | Feb. 9, 1932 |
| 2,188,146 | Fraula | Jan. 23, 1940 |
| 2,693,717 | Schick | Nov. 9, 1954 |

FOREIGN PATENTS

| | | |
|---|---|---|
| 594,808 | France | Sept. 19, 1925 |